(12) United States Patent
Wright

(10) Patent No.: US 6,284,528 B1
(45) Date of Patent: Sep. 4, 2001

(54) SMALL SCALE AUTOMATED COMPOSTER

(76) Inventor: James Wright, 511 Woodland Acres Crescent, R.R. #7, Maple, Ontario (CA), L6A 1G2

(*) Notice: Subject to any disclaimer, the term of this patent is extended or adjusted under 35 U.S.C. 154(b) by 0 days.

(21) Appl. No.: 09/403,102

(22) PCT Filed: Apr. 22, 1998

(86) PCT No.: PCT/CA98/00381

§ 371 Date: Oct. 15, 1999

§ 102(e) Date: Oct. 15, 1999

(87) PCT Pub. No.: WO98/49122

PCT Pub. Date: Nov. 5, 1998

Related U.S. Application Data

(60) Provisional application No. 60/044,102, filed on Apr. 24, 1997.

(51) Int. Cl.[7] ..................................................... C12M 1/02
(52) U.S. Cl. ..................................... 435/290.2; 435/290.4
(58) Field of Search ............................. 435/290.2, 290.4

(56) References Cited

U.S. PATENT DOCUMENTS 5,047,349  9/1991  Eweson.

FOREIGN PATENT DOCUMENTS

| 19030415 | 2/1997 | (DE). |
| 0599661 | 6/1994 | (EP). |
| 2701257 | 8/1994 | (FR). |
| 2704120 | 10/1994 | (FR). |

*Primary Examiner*—David A. Redding
(74) *Attorney, Agent, or Firm*—Ridout & Maybee

(57) ABSTRACT

A domestic or small scale composter has an air tight housing (10) with an inlet (36) for compostable material such as garbage. The inlet (36) leads to a mixing chamber (12) having mixing means (32, 34) to mix the compostable material and to direct it into a composting chamber (14) for further processing. An overflow dam wall (18) is provided between the mixing chamber (12) and the composting chamber (14). Airflow is preferably provided downwardly through the composting chamber (14).

13 Claims, 2 Drawing Sheets

SMALL SCALE AUTOMATED COMPOSTER

This Application is a 371 of PCT/CA98/00381 filed Apr. 22, 1998 and also claims benefit of Provisional No. 60/044,102 filed Apr. 24, 1997.

BACKGROUND OF THE INVENTION

1. Field of the Invention

This invention relates to an automated composter suitable for small scale use such as for single household domestic use.

2. Acknowledgement of Prior Art

While many automated composters for large scale use are known and are practicable, the smaller the composter the more difficult it is to obtain efficient operation. No automated composter small enough for domestic use is known. Current thinking concerning environmental considerations lead to the desirability of composting not only on a large scale but at every level of garbage disposal. On a very small scale such composting has been difficult. Composting containers are available but it has been necessary to hand mix the garbage. Moreover, simple non-aerated composting containers do not effectively compost fish, meat and some other garbage.

The only form of automatic composting on a small scale is very specialized. Automated composting toilets are available for circumstances where flush toilets are unsuitable. Composting toilets are not suitable for general purpose use. The input to such composters is especially suitable for easy composting. Usually such toilets include a composting drum which is either turned by hand periodically or turned by an electric motor periodically. There is usually no forced air circulation in composting toilets although there is provision for passive air circulation and, since these devices are usually located inside a dwelling, an external vent for noxious gases is provided.

The inventor, in the present case, has addressed the problems of providing a composting unit small enough for domestic use which will require no manual turning of the compost, which is efficient enough to compost animal based biodegradable garbage, and from which the vent emits non-noxious gas.

SUMMARY OF THE INVENTION

According to the invention there is provided a composter for domestic or small scale use comprising an airtight housing about a preliminary mixing chamber for compostable material have an imperforate floor and a secondary composting chamber, having an inlet to the mixing chamber for garbage and an outlet from the composting chamber for compost, there being a dividing wall between said preliminary mixing chamber and said secondary composting chamber, a communicating aperture A being provided above the dividing wall between an upper part of the preliminary mixing chamber and an upper part of the secondary composting chamber, mixing means being provided in the mixing chamber arranged to circulate composting garbage within the mixing chamber about a horizontal axis parallel to the plane of the dividing wall in a path such that, when the level of composting garbage is above the dividing wall, said garbage is directed in its circulatory path towards said aperture to spill over into said secondary composting chamber. Air flow means are provided comprising an inlet into an upper part of said primary mixing chamber, air communication means between said primary mixing chamber and said secondary composting chamber, air dissipation means for said secondary composting chamber, air communication means from said composting chamber to an air filter, and air outlet means from the housing and a fan to promote the circulation of air through said airflow means.

BRIEF DESCRIPTION OF THE DRAWINGS

An embodiment of the invention will now be described by way of example with reference to the drawings, in which.

DETAILED DESCRIPTION OF A PREFERRED EMBODIMENT

Figure 1:
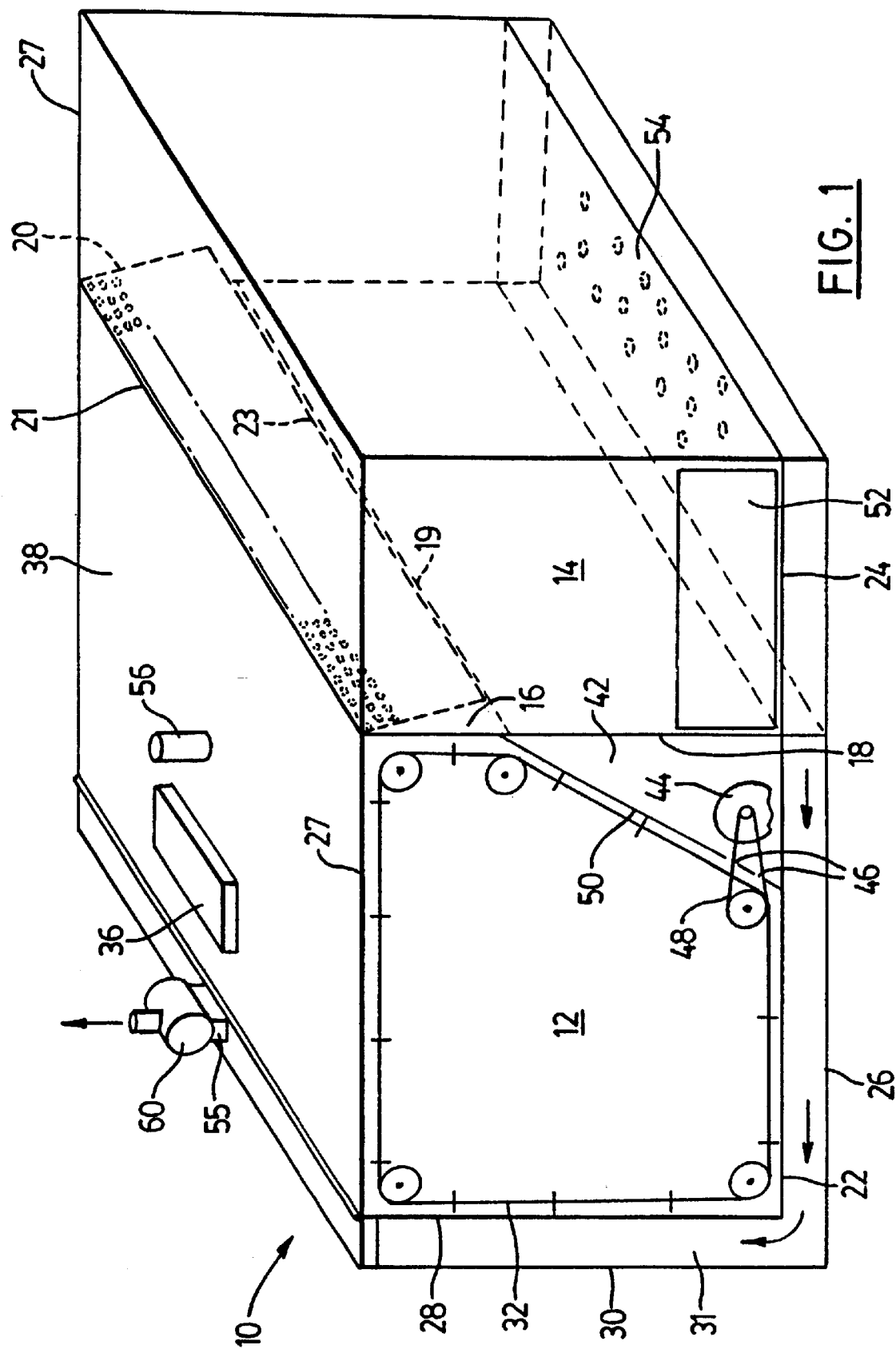
FIG. 1 shows one embodiment of a composter according to the invention.

In the drawings, a composter comprises a housing 10 about a mixing chamber 12 and a composting chamber 14. The size of the housing may conventionally be that of a domestic clothes washer and dryer although larger or even smaller housings are possible. The mixing chamber 12 communicates with the composting chamber 14 by way of an aperture 16 above a dividing wall 18 between the chambers 12, 14 extending between side walls 27 of the housing 11. The aperture 16 is usually closed by a loose hinged flap 20 which is perforated to allow for air flow through the flap.

The mixing chamber 12 and the composting chamber 14 may have top and side walls common with the housing but the mixing chamber floor 22 and the composting chamber floor 24 are located above the housing floor 26 to allow for air flow therebetween in a manner which will be described hereinafter. As illustrated, one end wall 28 of the mixing chamber is spaced inwardly from the corresponding end wall 30 of the housing. The space between these end walls 28, 30 accommodates a bio-filter 31 for filtering air.

Figure 2:
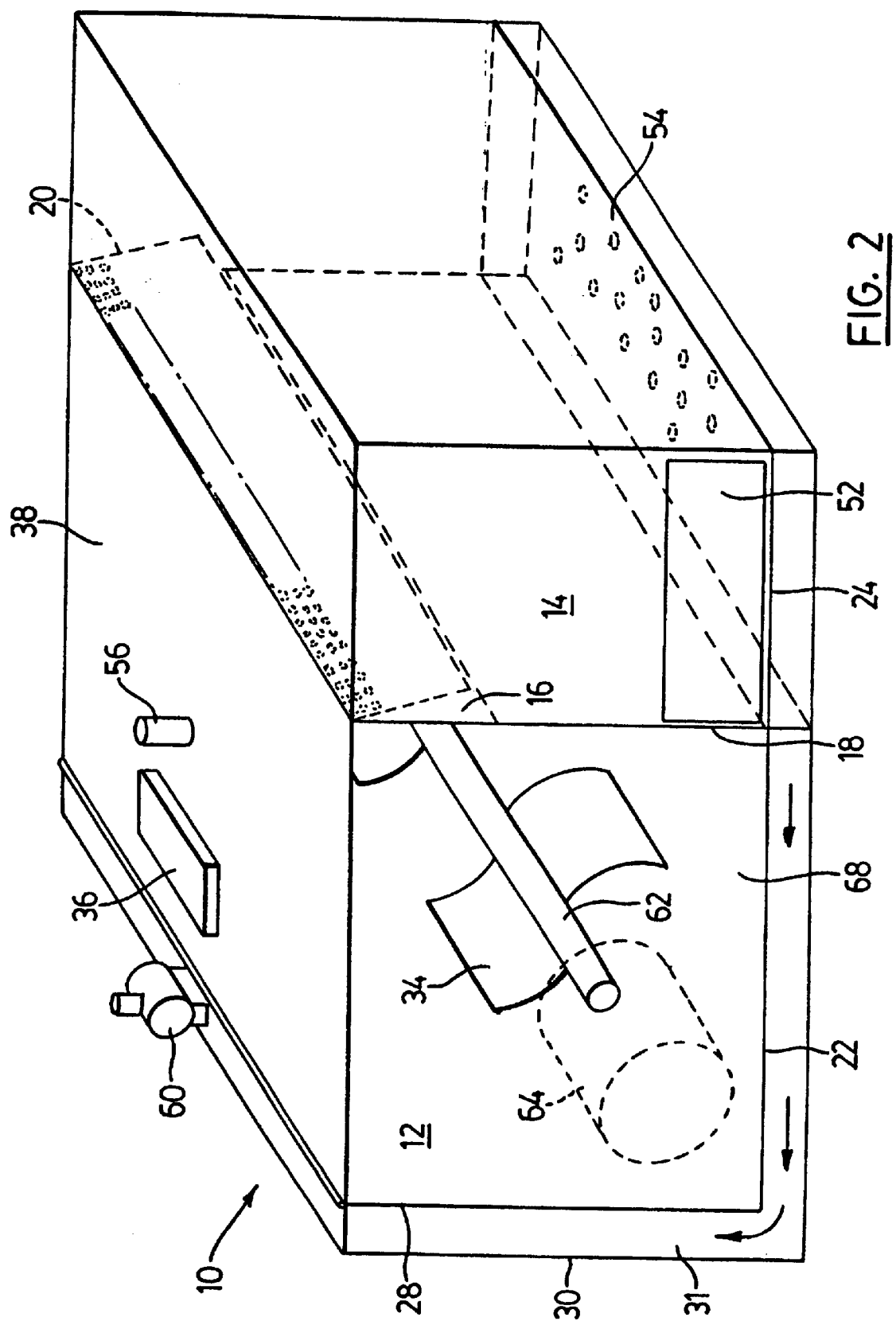
FIG. 2 shows another embodiment of the composter according to the invention.

Mixing means is provided within the mixing chamber 12 and may be, for example, an endless belt 32 as illustrated in FIG. 1 or a paddle mixer as illustrated in FIG. 2. Except where different parts are involved, reference numerals used in FIGS. 1 and 2 are used for comparative parts.

Garbage is fed into the mixing chamber 12 through an inlet 36 in the top 38 of the housing 10 which is also the top of the mixing chamber 12. Inlet 36 may have a grinder associated with it so that garbage may be delivered to the composter in comminuted form. The inlet 36 is closable in an airtight manner in a variety of conventional ways. For example, the inlet 36 may be a simple lid sealingly engaging an upstanding ring around an inlet aperture or it may incorporate a blender or grinder for garbage. There are many other arrangements for the inlet.

Mixing means is arranged within the mixing chamber to circulate the garbage in a path generally following down the dividing wall 18 away from the aperture 16 along the floor 22 towards the other sidewall 28, up this other end wall 28, and back towards the dividing wall under the top 38. When the level of garbage is higher than the top of dividing wall 18, garbage will tend to spill over into the composting chamber in its travel towards the dividing wall 18 and aperture 16. Pressure of garbage in its travel towards dividing wall 18 will operate the flap 20 to allow garbage to fall into the composting chamber 14.

The mixing means may be an endless belt 32 extending down the dividing wall 18 along the floor 22 up the end wall 28 and across the lower surface of top 38. When the mixing means is an endless belt it may be possible to locate its path to provide thorough mixing in corners of the mixing chamber which are often dead areas in conventional mixing. Conveniently, dividing wall 18 is formed as a wedge shaped hollow compartment 42 housing a motor 44 for the belt 32. Shielded aperture 46 may be provided for a drive belt 48 leading out of compartment 42 to drive belt 40. The compartment 42 may conveniently be shaped as a wedge having the shape of a right-angled triangle. One side forms a vertical wall of composting chamber 14, a side at right angles thereto forms the floor and the remaining side forms a sloped part 50 of the dividing wall 18 within mixing chamber 12. This sloped part 50 is convenient in that it tends to lead at least part of the garbage back into mixing chamber 12 rather than allowing all of it to pass through aperture 16 in the path of its travel around chamber 12 under the influence of mixing belt 32. A suitable angle for sloped wall 50 is 45° but steeper angles may be desirable. Thus it may be seen that a proportion of the garbage being mixed in mixing chamber 12 passes through flap door 20 into the composting chamber and a proportion of stays in mixing chamber 12. The ratio of these proportions are dependent upon the characteristics and speed of belt 32 and on the slope of sloping part 50 of dividing wall 18. Motor 44 may be controlled by presettings or by a computer to run at predetermined intervals in accordance with the amount of garbage being added over a period and the length of time for which mixing is required.

Garbage entering composting chamber 14 should be allowed to stay in that chamber curing or composting until reaction is complete. This reaction is usually complete in a period of 30 days although longer and shorter periods are possible. An outlet door 52 is provided for accessing composted garbage to remove it from chamber 14. It may be convenient to provide a tray on the floor 54 of composting chamber 14 for easy removal of garbage. The tray may be pulled or rolled out of the chamber through door 52 and replaced by another similar tray. If trays are used they should be perforated trays to allow for airflow through composting chamber 14.

In a small composter airflow for the composting process is extremely important. An air inlet 56 may be provided in the top 38 of mixing chamber 12 or in any upper part of mixing chamber 12. Air is drawn into the composter by any convenient means. As illustrated this means is a fan 60 at the outlet 55 of the airflow distribution system. Air passing into the mixing chamber 12 from air inlet 58 then passes through the perforated flap 20 into the composting chamber 14. The perforations in flap 20 cover the top part of the flap over the whole width of it and help distribute the air as it passes into composting chamber 14. Composting chamber 14 also has a perforated floor 54. The perforations in the floor 54 cover the whole floor surface thus air flowing through composting chamber 14 tends to be distributed throughout the chamber to enhance the composting reaction.

Spent air exiting from composting chamber 14 through perforated floor 54 enters the space between the housing floor 26 and the composting chamber floor 24 and passes into the space between the housing floor 26 and the mixing chamber floor 22.

Mixing chamber floor 22 is solid, as indeed are all the walls of the mixing chamber so that composting foul smelling garbage is confined therein. Only when composting is well advanced in composting chamber 14 does gas circulate to the bio-filter and thence to the atmosphere.

The main spent gas flow from the space between the housing floor 26 and the mixing chamber floor 22 passes into the space between the sidewall 28 of the mixing chamber and the sidewall 30 of the housing to pass through the filter 60 located therein. The filter 60 may be any suitable filter which will remove any remaining noxious gas from the spent oxygenating gases.

FIG. 2 shows a modified form of the apparatus described with reference to FIG. 1. In FIG. 2 the endless belt 40 has been replaced by paddles 34 arranged on driven axle 62 parallel to overflow dam wall 18. Such paddles 34 may provide adequate mixing even if material in corners of the mixing chamber tends to be missed. In this case dividing wall 18 need not be a hollow wedge to accommodate an electric motor. Electric motor 64 may be mounted on a end wall 68 of a pair of opposed end walls at right angles to end wall 68. Preferably each end wall 68 is flush with or forms a end wall of the housing 10.

I claim:

1. A composter comprising an airtight housing (10) about a composting region, an inlet (36) for compostable material, mixing means (32, 34) within the housing (10) and an outlet (52) for composted material;

is characterized in that the composting region comprises a mixing chamber (12) for compostable material, the mixing chamber having an imperforate floor (22) and a composting chamber (140 for mixed compostable material and the mixing chamber (12) communicating with the composting chamber (14) through an aperture (16) within the housing (10) above an overflow dam wall (18) between the mixing chamber (12) and the composter chamber (14) for compostable material to flow from the mixing chamber (12) into the composting chamber (14) when the level of compostable material rises to a level above the level of the overflow dam wall;

the mixing means (32, 34) being located in the mixing chamber (12) to circulate compostable material in a circulatory path in the mixing chamber having a horizontal circulatory axis parallel to the plane of said overflow dam wall (18), the direction of rotation being such that composting material is directed towards the overflow dam wall (18) in an upper part of said circulatory path.

2. A composter as claimed in claim 1 characterized in that the overflow dam wall 18 extends from one side (27) of the housing (10) to an opposed side (27) of the housing (10).

3. A composter as claimed in claim 2 characterized in that the mixing means comprise an endless belt (32) rotating down the overflow dam wall (18), along the mixing chamber floor (22), up an end wall (28) of the mixing chamber (12) and across a lower surface of the housing top (38).

4. A composter as claimed in claim 3 characterized in that the belt (32) is drivable by a drive belt (40) of a motor (44) housed in a compartment (42) within the mixing chamber (12), the drive belt 40 extending out of said compartment (42), shielding (46) being provided to protect drive belt (40) from compostable material.

5. A composter as claimed in claim 5 characterized in that the compartment (42) is a wedge shaped compartment adjacent a lower part of the overflow dam wall (18).

6. A composter as claimed in claim 2 characterized in that the mixing means comprises paddles (34) arranged on a driven axle (62) parallel to the overflow dam wall (18).

7. A composter as claimed in claim 2 in which the aperture (16) is closable by means of a flap (20) having a top edge (21) freely hinged to the top (38) of the housing (10) and a bottom edge (23) adjacent a top edge (19) of overflow dam wall (18) whereby the flap is openable under pressure of overflowing compostable material and closable under gravity.

8. A composter as claimed in claim 3 characterized in that the floor (22) of the mixing chamber (12) and a floor (24) of the composting chamber (14) are spaced above a floor (26) of the housing (10) and the space between mixing chamber floor (22) and housing floor (26) communicates with the space between the composting chamber floor (24) and the housing floor (26).

9. A composter as claimed in claim 8 characterized in that the floor (24) of the composting chamber (14) is perforated.

10. A composter as claimed in claim 9 in which the flap (20) is perforated.

11. A composter as claimed in claim 10 in which the end wall (28) of the mixing chamber (12) is spaced from an end wall (30) of the housing (10) and a space therebetween communicates with the space between the mixing chamber floor (22) and the housing floor (26).

12. A composter as claimed in claim 11 characterized in that a biofilter for air is provided in the space between the housing end wall (30) and the mixing chamber end wall (28).

13. A composter as claimed in claim 12 characterized in that an air inlet (56) into the mixing chamber (12) is provided in the housing top (38) and an air outlet (55) is provided communicating with the space between the mixing chamber end wall (28) and the housing end wall (30) above the biofilter and a fan is provided to draw air through the composter from the air inlet (56) to an air outlet (55) downwardly through the composting chamber (14).

* * * * *